United States Patent [19]

Gould et al.

[11] Patent Number: 4,627,936

[45] Date of Patent: Dec. 9, 1986

[54] TOWEL PREMOISTENED WITH ANTISTATIC SOLUTION FOR CLEANING CATHODE-RAY TUBES AND THE LIKE

[75] Inventors: Peter J. Gould; Philip D. Turits, both of Greenwich, Conn.

[73] Assignee: Gould Paper Corp., New York, N.Y.

[21] Appl. No.: 658,260

[22] Filed: Oct. 5, 1984

[51] Int. Cl.$^4$ .................. C11D 1/12; C11D 1/755
[52] U.S. Cl. .................. 252/558; 252/554; 252/91; 428/289; 15/209 R; 15/104.93
[58] Field of Search .................. 252/554, 558, 91, 170; 15/209 R, 104.93, 209 C; 428/289

[56] References Cited

U.S. PATENT DOCUMENTS

| | | | |
|---|---|---|---|
| 2,288,714 | 7/1942 | Jones | 15/209 |
| 2,353,978 | 7/1944 | Weber | 15/209 |
| 2,990,375 | 6/1961 | Steinhauer et al. | 252/138 |
| 2,999,265 | 9/1961 | Duane et al. | 15/506 |
| 3,002,883 | 10/1961 | Butt et al. | 424/106 |
| 3,121,249 | 2/1964 | Affleck et al. | 74/751 |
| 3,172,861 | 3/1965 | Steinhauer et al. | 252/187 |
| 3,248,335 | 4/1966 | Teot et al. | 252/161 |
| 3,274,116 | 9/1966 | Mills et al. | 252/106 |
| 3,335,449 | 8/1967 | Faessinger et al. | 15/506 |
| 3,406,418 | 10/1968 | Hurley, Jr. et al. | 15/104.93 |
| 3,534,887 | 10/1970 | Ginsberg | 222/107 |
| 3,563,371 | 2/1971 | Heinz | 206/46 |
| 3,619,280 | 11/1971 | Scheuer | 15/209 |
| 3,654,165 | 4/1972 | Bryant et al. | 252/90 |
| 3,672,993 | 6/1972 | Mitchell et al. | 134/3 |
| 3,686,025 | 8/1972 | Morton | 428/219 |
| 3,717,590 | 2/1973 | Fetty | 252/540 |
| 3,786,615 | 1/1974 | Bauer | 53/21 |
| 3,791,977 | 2/1974 | Ancel et al. | 252/156 |
| 3,793,212 | 2/1974 | Gray et al. | 252/99 |
| 3,818,533 | 6/1974 | Scheuer | 15/104.93 |
| 3,824,190 | 7/1974 | Winicov et al. | 252/106 |
| 3,897,356 | 7/1975 | Pociluyko | 252/91 |
| 4,071,463 | 1/1978 | Steinhauer | 252/103 |
| 4,096,311 | 6/1978 | Pietreniak | 428/289 |
| 4,258,849 | 3/1981 | Miller | 206/812 |
| 4,259,373 | 3/1981 | Demessemackers et al. | 427/242 |
| 4,343,403 | 8/1982 | Daniels et al. | 206/812 |
| 4,448,704 | 5/1984 | Barby et al. | 252/174.23 |

OTHER PUBLICATIONS

U.S. Dept. of Labor, OSHA Material Safety Data Sheet—Conco Sulfate 2A1.
Technical Bulletin, Conco AAS-45S, Continental Chemical Co., Clifton, N.J.
U.S. Dept. of Labor, OSHA Material Safety Data Sheet—Conco AAS-45S.
Technical Bulletin, Conco Sulfate 2A1, Continental Chemical, Clifton, N.J.

*Primary Examiner*—Paul Lieberman
*Assistant Examiner*—John F. McNally
*Attorney, Agent, or Firm*—Pennie & Edmonds

[57] ABSTRACT

A premoistened and prepackaged product for cleaning cathode-ray tubes and the like, comprising a non-woven 100% rayon web which is chemically softened and impregnated with an antistatic solution. The solution includes sodium n-dodecyl diphenyl ether disulfonate, combined with sodium dodecyl benzene sulfonate, ethyl alcohol, and water.

23 Claims, No Drawings

TOWEL PREMOISTENED WITH ANTISTATIC SOLUTION FOR CLEANING CATHODE-RAY TUBES AND THE LIKE

BACKGROUND OF THE INVENTION

1. Field of the Invention

The invention relates to a premoistened and prepackaged towel for cleaning a glass surface, particularly a surface that is subject to a static electric charge such as the screen of a cathode-ray tube. It relates more particularly to a towel made of non-woven material, and an antistatic solution contained therein which includes selected surfactants and an alcohol base.

2. Description of Related Art

Cathode-ray tubes (CRTs) are subject to a static charge when operated, and therefore they attract dust and dirt to a greater extent than other surfaces. The problem is particularly acute in business and industrial workplaces, where workers using CRTs are apt to touch the CRT screen to focus attention on a particular spot or to mark a place while making handwritten notes. This occurs even more often with the so-called "touch-screens," in which data and commands are entered by actually touching the screen. Touching the screen deposits skin oil, which must be frequently removed. For reasons of safety and efficiency, it is important for the cleaning of the screen to be as rapid and convenient as possible.

The general concept of a prepackaged and premoistened "towelette" for cleaning various surfaces is known, but such products have not been intended or specially adapted for cleaning the surface of a cathode-ray tube.

For example, one article for cleaning glass and preventing misting is disclosed in U.S. Pat. No. 2,288,714 to Jones. This is a dry sheet of finely textured, soft and porous paper or cloth, which is treated with any one of a number of well-known anti-mist agents. U.S. Pat. No. 3,335,449 to Faessinger et al. relates to a dry paper wiper for cleaning glass surfaces that is wet-strengthened and contains an additive to resist resoiling and formation of droplets. U.S. Pat. No. 2,353,978 to Weber discloses a dry absorbent non-linting fibrous material, which may be a non-woven material, impregnated with a surfactant for polishing and preventing fogging of glass, metal, and similar surfaces. U.S. Pat. No. 3,406,418 to Hurley et al. relates to a dry, lint-free lens-cleaning paper or cloth containing adhering and dispersed particles of a finely-divided, waxy fluorocarbon telomer. U.S. Pat. Nos. 3,619,280 and 3,818,533, both to Scheuer, relate to a treated paper or nonwoven material for various uses, including wiping and polishing glass surfaces.

Other products for cleaning hard surfaces are disclosed in U.S. Pat. Nos. 3,654,165 (Bryant et al.), and 3,121,249 (Affleck et al.). Bryant et al. discloses a cleaning and sanitizing compound comprising a detergent surfactant, a volatile bacteriocidal vehicle and a bacteriocide. A wiper for the compound, such as lens paper, non-woven rayon or the like, is also disclosed. The Affleck et al. patent relates to a detergent-impregnated paper dish cloth. U.S. Pat. No. 4,096,311 (Pietreniak) relates to a nonwoven web containing about 0.5 to 3 percent by weight of a surfactant for cleaning hard surfaces.

A saturated pad containing surfactants for cleaning and deodorizing the human body is shown in U.S. Pat. No. 2,999,265 to Duane et al. It is made of a non-linting fibrous material, either woven or non-woven, is packaged in a hermetically sealed envelope. The surfactant composition is preferably a combination of one anionic and one non-ionic surfactant, each being preferably 0.1 to 0.5 percent by weight of the liquid. The composition also includes a bacteriostatic agent and is 86 percent water.

OBJECTS AND SUMMARY OF THE INVENTION

Accordingly, an object of this invention is to provide a cleaning product for CRTs and the like, which are subject to receiving a static electric charge.

A further object is to employ surface-active agents with effective antistatic properties.

Another object is to provide a cleaning towel which is non-linting and non-streaking.

A further object is to premoisten and prepackage the cleaning towel in a sealed envelope for greatest convenience of use.

A premoistened and prepackaged towel impregnated with an antistatic solution specially adapted for cleaning the screen of a cathode-ray tube has been developed to accomplish the preceding objects.

Another object of the invention is to provide a method for cleaning cathode-ray tubes and the like by utilizing the antistatic solutions and cleaning products described herein.

In accordance with an aspect of the invention there is provided an antistatic solution for cleaning cathode-ray tubes and the like, at least one component of which is a surfactant of an alkali metal salt of an aryl sulfonate. Compounds that have been found to be particularly advantageous are the alkali metal salts of alkylated aryl disulfonates, wherein the alkyl group has between 10 and 15 carbon atoms. The most advantageous compounds known to date are the alkali metal salts of n-dodecyl diphenyl ether disulfonates and particularly sodium n-dodecyl diphenyl ether disulfonate.

According to a further aspect of the invention, the antistatic solution comprises an alkali metal salt of an aryl sulfonate, as described above, in combination with a second sufactant of an alkali metal salt of an alkylated aryl sulfonate wherein the alkyl group has between 10 and 15 carbon atoms. These compounds would include alkali metal salts of dodecyl benzene sulfonate. The most advantageous combination known to date is sodium n-dodecyl diphenyl ether disulfonate and sodium dodecyl benzene sulfonate.

These surfactants also may advantageously be combined with carriers such as alcohols, particularly ethyl alcohol, and/or water. According to a further aspect of the invention, a web material is impregnated with such antistatic solution.

One method of the present invention comprises applying the previously described products to the screen of a cathode-ray tube or the like. An alternative method is directed to the impregnation of a nonwoven web with the previously described antistatic solutions and contacting the screen with the impregnated web.

Further objects, features, and advantages of the invention will be understood from the following specification.

DETAILED DESCRIPTION OF PREFERRED EMBODIMENTS

A web of non-woven 100% rayon material with an acrylic binder, in roll form, is chemically softened during manufacture by treatment with a conventional softening surfactant. The web is folded over folding bars, cut, and inserted into an air-tight and water-tight three-ply envelope. The envelope preferably consists of an outer layer of white bleached kraft paper, a middle layer of foil, and an inner layer of extruded polyethylene. A nozzle is inserted into an open end of the envelope, and a measured quantity of an antistatic solution, which will be further discussed below, is inserted. The envelope is then sealed. Over a period of about 24 hours, the capillary action of the rayon web causes it to become substantially saturated with the antistatic solution.

The antistatic solution comprises, at least, an alkali metal salt of an alkylated aryl disulfonate wherein the alkyl group has between 10 and 15 carbon atoms. Sodium n-dodecyl diphenyl ether disulfonate has been discovered to have particularly effective antistatic properties. Sodium n-dodecyl diphenyl ether disulfonate is available from Continental Chemical Co., 270 Clifton Blvd., Clifton, N.J. 07015, under the trade name CONCO SULFATE 2A1. It is produced by a manufacturing method that includes essentially the following steps:

(1) alkylation of dodecene with diphenyl oxide, followed by
(2) sulfonation with chlorosulfonic acid, followed by
(3) neutralization with caustic soda.

In an alternate embodiment, the antistatic solution comprises a surfactant of an alkali metal salt of an alkylated aryl disulfonate as described above, in combination with a second surfactant of an alkali metal salt of an alkylated aryl sulfonate wherein the alkyl group has between 10 and 15 carbon atoms.

The most surprising combination to date is sodium n-dodecyl diphenyl ether disulfonate and sodium dodecyl benzene sulfonate. With this combination, there is an apparent synergistic effect that results in unexpected and dramatically improved antistatic and detergent properties.

Two antistatic solutions that incorporate sodium dodecyl benzene sulfonate and sodium n-dodecyl diphenyl ether disulfonate in combination have been formulated and found to be particularly effective. In addition to the two surfactants, the solutions also contain ethyl alcohol and water. The proportions of these components are as follows.

EXAMPLE 1

Sodium dodecyl benzene sulfonate: 0.1–1.0%
Sodium n-dodecyl diphenyl ether disulfonate: 0.1–1.0%
Ethyl alcohol: 60–65%
Water: 30–35%

EXAMPLE 2

Sodium dodecyl benzene sulfonate: 0.1–1.0%
Sodium n-dodecyl diphenyl ether disulfonate: 0.1–1.0%
Ethyl alcohol: 10–15%
Water: 80–85%

The preferred amount of each of the surfactants in the above compositions is 0.25 percent by weight, but for purposes of manufacturing economy the above ranges may be tolerated. It is to be understood that the Examples are illustrative rather than limiting, and that variations and modifications of the Examples are possible within the scope of the claimed invention.

In use, the various features of the invention co-operate to produce superior cleaning of cathode-ray tubes. The towel is chemically softened to prevent scratching. It is made of non-woven rayon rather than cotton or wood-based fibers, which prevents linting. The antistatic solution both removes dust and dirt on the CRT screen and prevents further attraction of such dust and dirt by static electric charges. The alcohol base of the solution dissolves grease and oil and also prevents streaking, which would occur with a water-based solution.

The solution of Example 1, which contains 60–65 percent by weight of ethyl alcohol, is particularly useful in applications in which the solvent properties of ethyl alcohol are especially important, for example in a factory environment. In the solution of Example 2, excellent results are obtained in an office environment, for example, by reducing the weight percentage of ethyl alcohol to only 10–15 percent, which makes the solution more economical while substantially retaining its solvent and anti-streaking properties. The solution of Example 2 is also useful in treating CRT screens that have an anti-glare coating of magnesium fluoride, which may be clouded by ethyl alcohol.

What is claimed is:

1. An antistatic solution for cleaning cathode ray tubes or the like consisting essentially of
   (a) from about 0.1 to 1 weight percent of a first surfactant of an alkali metal salt of an alkylated aryl disulfonate wherein the alkyl group has between 10 to 15 carbon atoms;
   (b) from about 0.1 to 1 weight percent of a second surfactant of an alkylated aryl sulfonate wherein the alkyl group has between 10 to 15 carbon atoms; and
   the balance of said composition constituting a liquid carrier comprising an alcohol, water and mixtures thereof.

2. The solution of claim 1 wherein the first surfactant is sodium n-dodecyl diphenyl ether dissulfonate.

3. The solution of claim 1 wherein the second surfactant is sodium dodecyl benzene sulfonate.

4. The solution of claim 1 wherein the liquid carrier constitutes between about 10 and 15 weight percent alcohol and the balance water.

5. The solution of claim 1 wherein the liquid carrier constitutes between about 60 to 65 weight percent alcohol and the balance water.

6. An antistatic solution consisting essentially of:
   a first surfactant of an alkali metal salt of an alkylated aryl disulfonate wherein the alkyl group has between 10 and 15 carbon atoms, the first surfactant present in an amount between about 0.1 and 1 weight percent of the solution;
   a second sulfonate of an alkali metal salt of analkylated aryl sulfonate wherein the alkyl group has between 10 and 15 carbon atoms, the second surfactant present in an amount between about 0.1 and 1 weight percent of the solution; and
   a liquid carrier comprising an alcohol in an amount of between about 10 and 65 weight percent of the solution, and water.

7. The solution of claim 6 wherein the alcohol is ethyl alcohol and each surfactant is present in an amount of about 0.25 weight percent.

8. A product for cleaning the surface of cathode ray tubes and the like comprising a web of porous material and the antistatic solution of claim 1 in an amount sufficient to remove static electric charges and dust from the surface of cathode ray tubes or the like.

9. A product for cleaning the surface of cathode ray tubes and the like which comprises a web of porous material and the antistatic solution of claim 2 in an amount sufficient to remove static electric charges and dust from the surface of cathode ray tubes or the like.

10. A product for cleaning the surface of cathode ray tubes and the like which comprises a web of porous material and the antistatic solution of claim 3 in an amount sufficient to remove static electric charges and dust from the surface of cathode ray tubes or the like.

11. A product for cleaning the surface of cathode-ray tubes and the like, comprising a web of porous material impregnated with an antistatic solution consisting essentially of a first surfactant in an amount of between about 0.1 and 1 weight percent of the antistatic solution, the first surfactant being an alkali metal salt of an alkylated aryl disulfonate wherein the alkyl group has between 10 and 15 carbon atoms, a second surfactant in an amount of between about 0.1 and 1 weight percent of the antistatic solution, the second surfactant being an alkali metal salt of an alkylated aryl sulfonate wherein the alkyl group has between 10 and 15 carbon atoms, and the balance of the solution being a liquid carrier selected from the group water, alcohol, and mixtures thereof.

12. The product according to claim 11 wherein the liquid carrier constitutes between about 10 and 15 weight ethyl alcohol and the balance water.

13. The product according to claim 11 wherein the liquid carrier constitutes between about 60 and 65 weight percent ethyl alcohol and the balance water.

14. The product of claim 11 wherein the web comprises rayon.

15. The product of claim 11 wherein each of the surfactants is present in an amount of about 0.25 weight percent and the liquid carrier constitutes between about 10 and 65 weight percent ethyl alcohol, balance water.

16. A method for cleaning a surface which is subject to a static electric charge which comprises:
impregnating a web of porous material with the antistatic solution of claim 1; and
contacting the surface with the impregnated web.

17. A method for cleaning a surface which is subject to a static electric charge which comprises:
impregnating a web of porous material with the antistatic solution of claim 3; and
contacting the surface with the impregnated web.

18. A method for cleaning a surface which is subject to a static electric charge which comprises:
imperganting a web of porous material with the antistatic solution of claim 2; and
contacting the surface with the impregnated web.

19. A method for cleaning a surface which is subject to a static electric charge which comprises contacting the surface with the product of claim 8.

20. A method for cleaning a surface which is subject to a static electric charge which comprises contacting the surface with the product of claim 9.

21. A method for cleaning a surface which is subject to a static electric charge which comprises contacting the surface with the product of claim 10.

22. A method for cleaning a surface which is subject to a static electric charge which comprises contacting the surface with the product of claim 11.

23. A method for cleaning a glass surface which is subject to a static electric charge which comprises:
wetting a web of rayon with the antistatic solution of claim 1 in an amount sufficient to remove static electic charges and dust from the glass surface; and
contacting the glass surface with the wetted web.

* * * * *